Aug. 14, 1934.   F. H. HEHEMANN   1,970,040
SELF DRAIN BONNET VALVE
Filed Aug. 31, 1931   2 Sheets-Sheet 1

INVENTOR
FREDERICK H. HEHEMANN.
BY Toulmin & Toulmin
ATTORNEYS

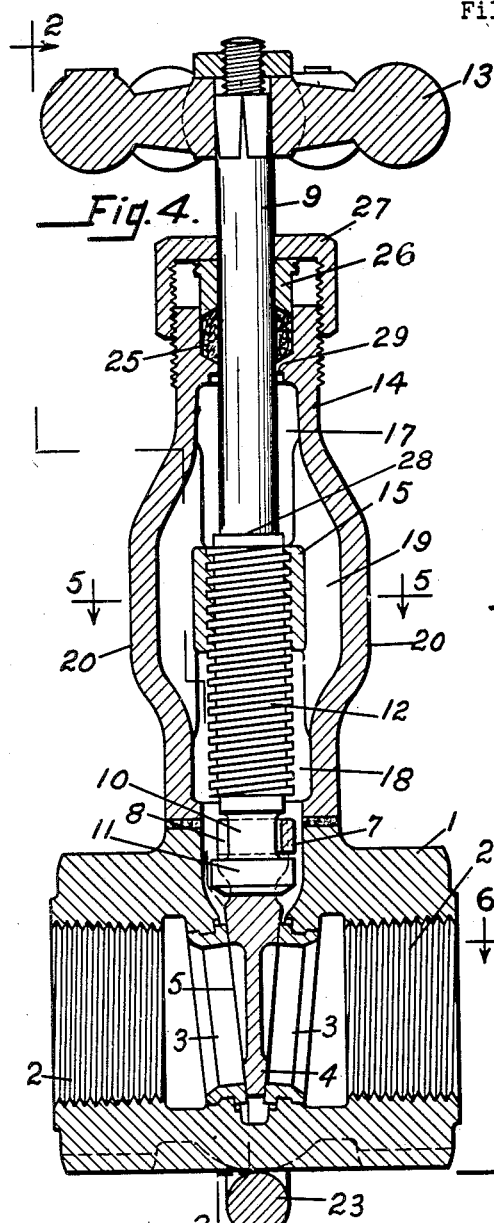

Patented Aug. 14, 1934

1,970,040

UNITED STATES PATENT OFFICE 1,970,040

SELF-DRAIN BONNET VALVE

Frederick H. Hehemann, Cincinnati, Ohio, assignor to The Lunkenheimer Company, Cincinnati, Ohio, a corporation of Ohio Application August 31, 1931, Serial No. 560,263

3 Claims. (Cl. 251—49)

This invention relates to the general classes of valves, and particularly to inside screw rising stem valves.

It is the object of this invention to provide a valve which will have interiorly retained therein a bushing of bronze or some other non-corrodible material.

It is a further object of this invention to provide a valve in which the non-corrodible bushing is cast within the bonnet of the valve in an immovable position.

It is another object of this invention to provide one or more passageways for draining water or any other fluid which may accumulate in the chamber above the stem thread to the bottom of the bonnet and out through the line passageway of the valve.

It is particularly the object of this invention to provide, in connection with the bushing, a passageway for draining any water or other liquid that may accumulate in the upper chamber to the bottom of the bonnet. The one or more passageways may be formed in the body of the bonnet or they may be formed in the bushing itself by drilling or coring.

These and other advantages will appear from the following description, taken in connection with the drawings.

Referring to the drawings:

Figure 4 is a vertical, longitudinal section through the valve structure.

Figure 5 is a section on the line 5—5 of Figure 4.

Figure 6 is a section on the line 6—6 of Figure 7.

Figure 7 is a section through the valve bonnet showing a section of corrodible material cast therein.

Figure 8 is an enlarged fragmentary view showing the connection between the bushing and the bonnet.

Figure 9 is a vertical, longitudinal section through the bonnet, showing a modified form of bushing in which the passageways between the upper and lower chambers of the bonnet are in the bushing.

Figure 10 is a section on the line 10—10 of Figure 9.

Figure 11 is a fragmentary view showing the connection between the bushing and the bonnet in the form shown in Figure 9.

Figure 1:
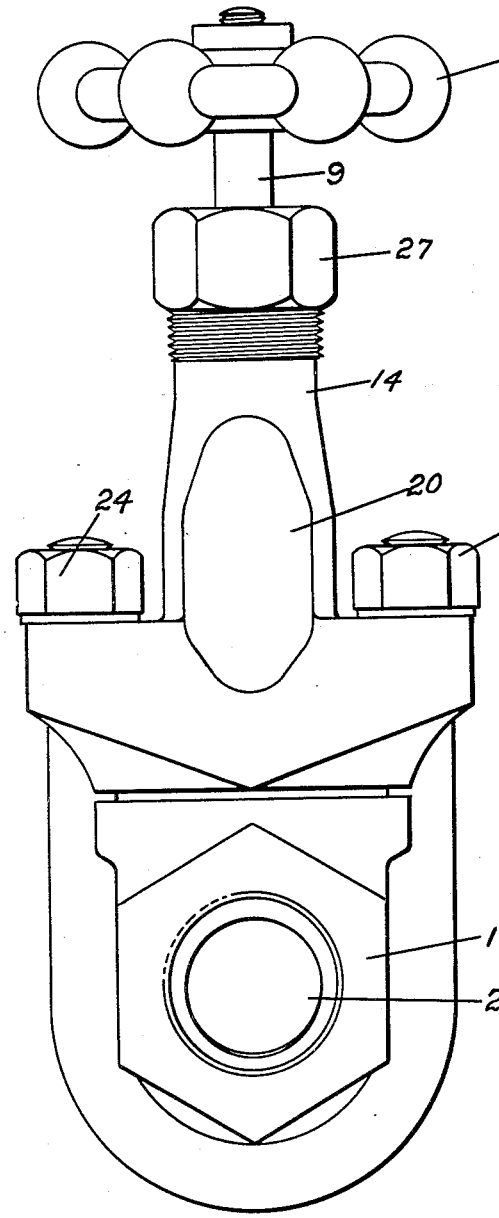
Figure 1 is an end elevation of the valve structure.
Figure 2:
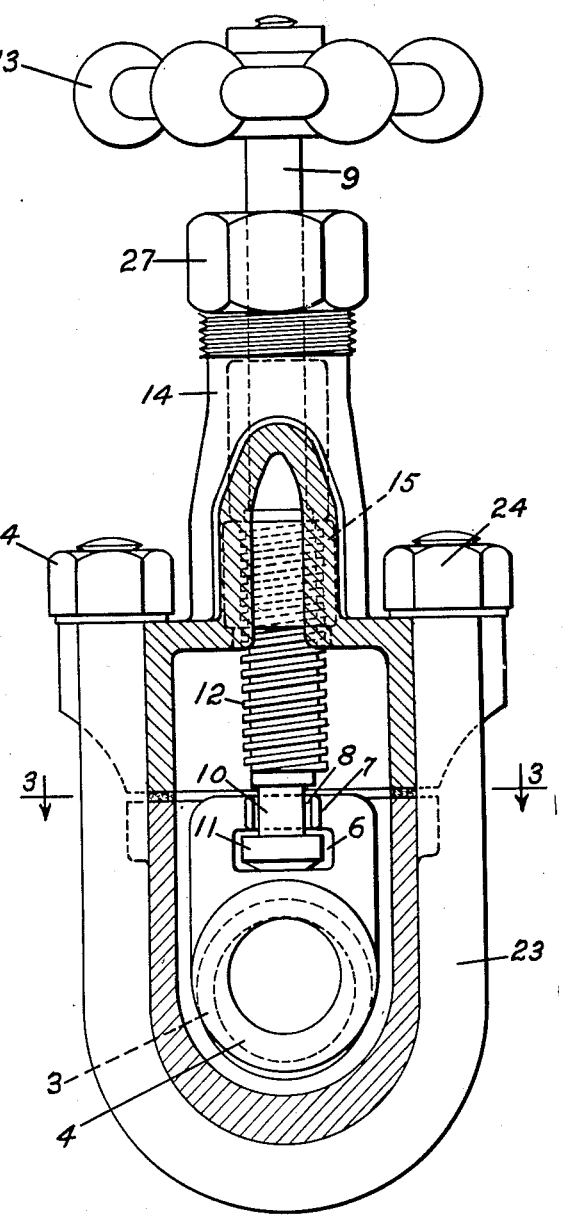
Figure 2 is a section on the line 2—2 of Figure 4.
Figure 3:
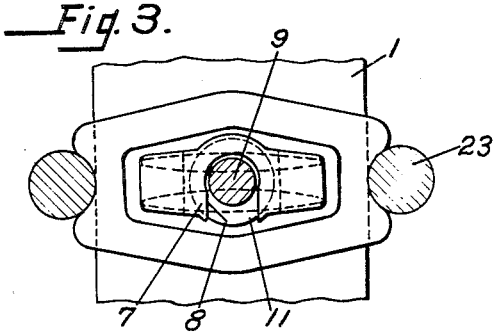
Figure 3 is a section on the line 3—3 of Figure 2.

The numeral 1 is used to designate a valve casing through which there is a fluid passageway 2 adapted to be threaded onto adjacent ends of two pipes. In this casing and across the passageway are ring seats 3, the adjacent faces of which form seats for a valve 4 adapted to be seated between the two rings for closing the passageway. The valve is disc-shaped with the faces somewhat V-shaped to correspond with the faces of the seat rings. The slanting faces of the disc are indicated by the numeral 5. The valve and the ring seats are made of non-corrodible material.

The upper end of the valve has formed therein a recess 6 above which there is a ledge 7 with a U-shaped slot 8 therein, centrally located in regard to the recess 6 so there is formed a means for holding the lower end of a valve stem 9 on the valve. The lower end of the valve stem is formed into a neck 10, which fits within the slot 8, and on this neck is a head 11 fitting in the recess 6 and below the ledge 7 so that a longitudinal movement of the valve stem will cause a longitudinal movement of the valve for opening and closing the passageway 2.

For the purpose of operating the valve stem and causing it to move longitudinally when rotated, it has threads 12 thereon intermediate its ends. On the end of the valve stem remote from the valve is a handle 13, by which the stem may be rotated. To one side of the casing and adapted to house the valve stem and the valve operating mechanism there is provided a bonnet 14, which is hollow and has cast therein in the formation of the bonnet, a bushing 15, as shown in Figure 4. This bushing is made of bronze, brass or some other non-corrosive material. In Figures 6 and 7 is shown an alternate construction in which the bushing is omitted and the threaded section 16 for the stem is cast integral with the bonnet.

In casting the bonnet around the bushing two chambers 17 and 18 are formed, one at each end of the bonnet, separated from each other by the bushing, but in order that the chambers may drain one into the other, passageways 19 are formed around the bushing in the bonnet. This formation of the passageways in the bonnet causes a bulge 20 on opposite sides of the bonnet. This is clearly shown from an examination of Figures 4, 5 and 6. Instead of having the passageways outside of the bushing the bushing 151 may be made to fill the space including the passageways formed in the cast bonnet, and in order to provide passageways connecting the two chambers the bushing 151 is drilled or cored, as indicated by the numeral 19' of Figure 9. These passageways, as shown in Figure 9, are to all intents and purposes the equivalent of the passageway 19 shown in Figure 4.

For preventing movement of the bushing in the bonnet the bushing has thereon one or more projections 21, which are embedded in the material of the bonnet when it is cast around the bushing. In order that the bonnet may be properly attached to the casing opposite sides of the bonnet are enlarged and have formed therein slots 22 for receiving the free ends of a U-bolt 23. This U-bolt passes around the casing and in the slots 22, and has on its free ends nuts 24 for clamping the bonnet to the casing. The valve stem passes through the bonnet and out at the end thereof opposite the valve casing.

In this end of the bonnet there is a chamber in which packing 25 is placed to prevent leakage around the valve stem. This packing is held in place by means of a gland 26. Fitting over the end of the bonnet and engaging the gland is a cap 27. This cap is threaded onto the free end of the bonnet. By means of the passageways from one chamber to the other of the bonnet any accumulation of water or other liquid in the upper chamber may be drained into the lower chamber and pass into the passageway through the casing.

The valve stem 9 is provided with a repacking seat 28 which makes a pressure-tight joint with a corresponding seat 29 below the stuffing box in the bonnet 14. The location of the repacking seat with reference to the bonnet drains permits the valve to be opened to the limit of its travel without interfering with the effective draining of the bonnet.

I desire to comprehend within my invention such modifications as may be embraced within my claims and the scope of my invention.

Having thus fully described my invention, what I claim as new and desire to secure by Letters Patent, is:

1. In a valve, a bonnet having therein a bushing forming within the bonnet an upper and a lower chamber, said bushing having a threaded hole therein and a lateral extension in the bonnet forming a drain passageway connecting said chambers, and a valve stem threaded into said threaded hole.

2. In a valve, a bonnet having therein a threaded stem support forming with the bonnet an upper and a lower chamber, a lateral extension on the bonnet forming a passageway from one chamber to the other around the stem support extending from one chamber to the other chamber.

3. In a valve, a bonnet having therein a threaded stem support forming with the bonnet an upper and a lower chamber, a lateral extension on the bonnet forming a passageway from one chamber to the other around the stem support extending from one chamber to the other chamber, and lateral extensions on said bonnet at right angles to the first extension for retaining the bonnet on the valve.

FREDERICK H. HEHEMANN.